(12) United States Patent
Backer et al.

(10) Patent No.: US 9,006,372 B2
(45) Date of Patent: Apr. 14, 2015

(54) SILICONE RESINS AND THEIR USE IN POLYMER COMPOSITIONS

(75) Inventors: Michael Backer, Mainz (DE); Pierre Chevalier, Lille (FR); Zhihua Liu, Shanghai (CN); Ana Marques, Portela LRS (PT); Satoshi Onodera, Ichihara (JP); Vincent Rerat, Tubize (BE); Motoshi Sasaki, Ichihara (JP)

(73) Assignees: Dow Corning (Shanghai) Co Ltd, Shanghai (CN); Dow Corning Toray Co., Ltd., Chiyoda-Ku, Tokyo (JP); Dow Corning Corporation, Midland, MI (US)

( * ) Notice: Subject to any disclaimer, the term of this patent is extended or adjusted under 35 U.S.C. 154(b) by 0 days.

(21) Appl. No.: 13/698,852

(22) PCT Filed: May 16, 2011

(86) PCT No.: PCT/CN2011/000845
§ 371 (c)(1),
(2), (4) Date: Nov. 19, 2012

(87) PCT Pub. No.: WO2011/143931
PCT Pub. Date: Nov. 24, 2011

(65) Prior Publication Data
US 2013/0066009 A1   Mar. 14, 2013

(30) Foreign Application Priority Data

May 20, 2010  (WO) ............... PCT/CN2010/000717
Jun. 1, 2010   (WO) ............... PCT/CN2010/000778

(51) Int. Cl.
C08G 77/26  (2006.01)
C08G 77/395 (2006.01)
C08G 77/30  (2006.01)
C08G 77/388 (2006.01)

(52) U.S. Cl.
CPC ............ *C08G 77/395* (2013.01); *C08G 77/26* (2013.01); *C08G 77/30* (2013.01); *C08G 77/388* (2013.01)

(58) Field of Classification Search
USPC ................... 524/537; 528/10, 38, 72
See application file for complete search history.

(56) References Cited

U.S. PATENT DOCUMENTS

| | | | |
|---|---|---|---|
| 4,093,641 A * | 6/1978 | Plueddemann | ............... 556/405 |
| 4,780,519 A | 10/1988 | Saam et al. | |
| 6,284,824 B1 | 9/2001 | Iji et al. | |
| 6,602,938 B1 | 8/2003 | Iji et al. | |
| 6,743,852 B2 | 6/2004 | Dershem et al. | |
| 7,041,709 B2 | 5/2006 | Klee et al. | |
| 7,157,509 B2 | 1/2007 | Li et al. | |
| 7,563,843 B2 | 7/2009 | Ozai et al. | |
| 2003/0187094 A1* | 10/2003 | Klee et al. | ............ 523/120 |
| 2005/0042961 A1 | 2/2005 | Lehmann et al. | |
| 2007/0167597 A1 | 7/2007 | Schafer et al. | |
| 2008/0241452 A1* | 10/2008 | Kondo et al. | ............ 428/40.1 |
| 2011/0224366 A1 | 9/2011 | Scheim et al. | |
| 2013/0065992 A1 | 3/2013 | Backer et al. | |
| 2013/0065993 A1 | 3/2013 | Backer et al. | |

FOREIGN PATENT DOCUMENTS

| | | |
|---|---|---|
| CN | 1509159 A | 6/2004 |
| CN | 1631942 A | 6/2005 |
| CN | 1944441 A | 4/2007 |
| CN | 1974721 A | 6/2007 |
| CN | 101274998 A | 10/2008 |
| CN | 101613370 A | 12/2009 |
| CN | 101665573 A | 3/2010 |
| DE | 102007037197 A1 | 2/2009 |
| JP | 2009197186 A | 3/2009 |
| SU | 757537 A1 | 8/1980 |
| TW | 201037014 A | 10/2010 |
| WO | WO 99/18092 A1 | 4/1999 |
| WO | WO 01/81352 A1 | 11/2001 |
| WO | WO 03/042196 A1 | 5/2003 |
| WO | WO 2006084665 A1 | 8/2006 |
| WO | WO 2007006567 A1 | 1/2007 |
| WO | WO 2009/019165 A1 | 2/2009 |

OTHER PUBLICATIONS

Lin, C. H., et al., "Preparation, thermal properties, morphology, and microstructure of phosphorus-containing epoxy/SiO2 and polyimide/SiO2 nanocomposites," Eur. Polymer J., 2007, 725-742.*
Hu, S., et al., "Effects of modified organic-inorganic hybrid materials on thermal properties of cotton fabrics," J. Therm. Anal. Calorim., 2011, 103, 423-427 (published online Oct. 27, 2010).*
Hu, Z., et al., "A novel efficient halogen-free flame retardant system for polycarbonate," Polymer Degradation and Stability, 2011, 320-327 (available online Mar. 11, 2010).*
Ping Wei et al., "Effect of Flame Retardant Containing Phosphorus and Silicone on Thermal Performance of PC/ABS," Journal of Wuhan University of Technology-Mater. Sci. Ed. Apr. 2009, pp. 235-240.
Qiang Li et al., "Thermal Degradation Behaviors of Polypropylene with Novel Silicon-Containing Intumescent Flame Retardant," School of Chemistry and Chemical Engineering, Shanghai Jiatong University, Shanghai 200240, 2005, 6 pages.
Hong-yan Tang et al., "A novel process for preparing anti-dripping polyethylene terephthalate fibers," Materials and Design 31 (2010) pp. 3525-3530.

(Continued)

Primary Examiner — Mark Eashoo
Assistant Examiner — Nicholas Hill
(74) Attorney, Agent, or Firm — Howard & Howard Attorneys PLLC

(57) ABSTRACT

Branched silicone (organopolysiloxane) resins and preparation method and use thereof are provided, which contain at least one group selected from phosphonate and phosphinate groups and at least one organic group containing nitrogen. Such silicone resins can be used in thermoplastic, thermosetting or rubber organic polymer compositions to reduce the flammability of the organic polymer compositions.

7 Claims, No Drawings

(56) References Cited

OTHER PUBLICATIONS

Dan-Qi Chen et al., "Flame-retardant and anti-dripping effects of a novel char-forming flame retardant for the treatment of poly(ethylene terephthalate) fabrics," Polymer Degradation and Stability 88 (2005) pp. 349-356.

Jiapei Ding et al., "Preparation and properties of halogen-free flame retardant epoxy resins with phosphorus-containing siloxanes," Polym. Bull. (2009) 62:829-841.

Maddalena Jurado-Gonzalez et al., "Synthesis, characterisation and catalytic activity of porous vanadyl phosphonate-modified silicas," Department of Chemistry, Queen Mary, University of London, Mile End Road, London, UK, 2002, pp. 3605-3609.

Hanfang Zhong et al., "Synthesis and Characteristics of a Novel Silicon-Containing Flame Retardant and Its Application in Poly [2,2-propane-(bisphenol) carbonate]/Acrylonitrile BButadiene Styrene," School of Chemistry and Chemical Engineering, Shanghai Jiatong University, Shanghai 200240, pp. 1542-1551.

Yin Shu et al., "Synthesis of a Novel Phosphorus-Containing Flame Retardant and the Thermal Stability of Flame Retarded PC/ABS," Journal of Functional Polymers, vol. 21, No. 2, pp. 159-163.

English language abstract for CN 101274998 extracted from espacenet.com database on Feb. 18, 2013, 13 pages.

English language abstract for CN 101613370 extracted from espacenet.com database on Feb. 18, 2013, 7 pages.

English language abstract for CN 1631942 extracted from espacenet.com database on Feb. 18, 2013, 12 pages.

English language abstract and machine-assisted translation for JP 2009197186 extracted from PAJ database on Feb. 18, 2013, 55 pages.

English language abstract and machine-assisted translation for CN1944441 extracted from Espacenet.com on Jan. 15, 2013, 18 pages.

English language abstract for TW 201037014 extracted from Espacenet.com on Jan. 15, 2013, 16 pages.

English language abstract for DE102007037197 extracted from Espacenet.com on Jan. 15, 2013, 20 pages.

English language abstract for CN 101665573 extracted from espacenet.com database on Feb. 20, 2013, 14 pages.

English language abstract for CN 1509159 extracted from espacenet.com database on Feb. 20, 2013, 22 pages.

English language abstract for CN 1974721 extracted from espacenet.com database on Feb. 20, 2013, 11 pages.

Zhong, H., Wei, P., Jiang, P. and Wang, G., Thermal Degradation Behaviors and Flame Retardancy of PC/ABS with Novel Silicon-Containing Flame Retardant, Fire Mater., vol. 31, 411-423 (2007).

Ishida, H. and Low, H.Y., Synthesis of Benzoxazine Functional Silane and Adhesion Properties of Glass-Fiber-Reinforced Polybenzoxazine Composites, J. Appl. Polym. Sci., 69: 2559-2567, 1998.

S. Gallagher et al., 'Siloxane-phosphonate finishes on cellulose: thermal characterization and flammability data' at 2004 Beltwide Cotton Conferences, San Antonio, TX, Jan. 5-9, 2004, pp. 2843-2846.

Yonghong Liu: 'Polybenzoxazine Containing Polysilsesquioxane: Preparation and Thermal Properties', Journal of Applied Polymer Science vol. 99, 2006, pp. 927-936.

Jun-Sheng Wang et al., Novel Flame-Retardant and Anti-dripping Branched Polyesters Prepared via Phosphorus-Containing Ionic Monomer as End-Capping Agent, Ind. Eng. Chem. Res., 2010, 49, pp. 4190-4196.

Andrea Minigher et al., "Synthesis and Characterization of Novel Cardanol Based Benzoxazines", Natural Product Communications, vol. 4, 2009, pp. 521-528, see particularly p. 526.

International Search Report for Application No. PCT/CN2011/000844 dated 8/25/201, 4 pages.

International Search Report for Application No. PCT/CN2011/000845 dated 8/25/201, 6 pages.

International Search Report for Application No. PCT/EP2011/057896 dated Nov. 15, 2011, 4 pages.

Xilei Chen, "Preparation and Thermal Properties of a Novel Flame-Retardant Coating", ScienceDirect, Polymer Degradion and Stability 92 (2007), pp. 1141-1150.

Chiang, C. -L., et al., "Synthesis, characterization and thermal properties of novel epoxy containing silicon and phosphorus nanocompsites by sol-gel method," Eur. Polymer J., 2002, 38, 2219-2224.

Wang, L., et al., "Synthesis, characteristic of a novel flame retardant containing phosphorus, silicon and its application in ethylene vinyl-acetate copolymer (EVM) rubber," J. Polymer Res., 2010, 17, 891-902.

* cited by examiner

SILICONE RESINS AND THEIR USE IN POLYMER COMPOSITIONS

RELATED APPLICATIONS

This application is the National Stage of International Patent Application No. PCT/CN2011/000845, filed on May 16, 2011, which claims priority to and all the advantages PCT International Patent Application No. PCT/CN2010/000717, filed on May 20, 2010 and PCT International Patent Application No. PCT/CN2010/000778, filed on Jun. 1, 2010, the contents of which are incorporated herein by reference.

This invention relates to branched silicone (organopolysiloxane) resins. It also relates to the preparation of such organopolysiloxanes and to their use in thermoplastic, thermosetting or rubber organic polymer compositions to reduce the flammability of the organic polymer compositions.

US-A-2007/0167597 describes phosphone ester modified organosilicon compounds prepared by reacting phosphonic ester functionalized alkoxysilane with a silanol-functional organosilicon compound.

CN-A-101274998 describes an epoxy phosphorus-containing hybridization hardener with heat resistance and flame retardancy for electron polymer material and a preparation method thereof. The phosphorus-containing hybridization hardener is a nanometer-sized organic/inorganic hybrid silicone of a hollow enclosed type or a partially enclosed type, wherein the structure centre of the silicone consists of inorganic skeleton Si—O bonds. The external structure consists of organic groups of organic phosphor or amidogen or imidogen.

The paper 'Thermal Degradation Behaviours of Polypropylene with novel Silicon-containing Intumescent Flame Retardant' by Qiang Li et al in J. Applied Polymer Science, Vol. 98, 2487-2492 (2005) describes the synthesis of N-[3-(dimethoxy-methyl-silanyl)-propyl]-N'-(9-methyl-3,9-dioxo-2,4,8,10-tetraoxa-3,9-diphospha-spiro-[5.5]undec-3-yl)-ethane-1,2-diamine/dimethoxy dimethyl silane copolymer and its incorporation into polypropylene to enhance the flame retardancy of the polypropylene. The paper 'Preparation and properties of halogen-free flame retardant epoxy resins with phosphorus-containing siloxanes' by Jiapei Ding et al in Polymer Bulletin, Vol. 62, 829-841 (2009) describes epoxy resin modifiers synthesized by addition reaction of divinyltetramethyldisiloxane with 9,10-dihydro-9-oxa-10-phosphaphenanthrene-10-oxide (DOPO).

The paper 'Synthesis, characterization and catalytic activity of porous vanadyl phosphonate-modified silicas' by M. Jurado-Gonzalez et al in J. Mater. Chem., Vol. 12, 3605-3609 (2002) describes synthetic routes to ethylphosphonic acid-modified silicas. The modified silicas are mesoporous solids with potential use as catalysts.

The paper 'Effect of Flame Retardant containing Phosphorus and Silicone on Thermal Performance of PC/ABS' by Wei Ping et al in Journal of Wuhan University of Technology—Mater. Sci. Ed. April 2009 at pp 235-240 describes a flame retardant comprising polydimethylsiloxane having a pendant group containing a DOPO moiety.

The paper 'Thermal degradation behaviours and flame retardancy of PC/ABS with novel silicon-containing flame retardant' by Hanfang Zhong et al. in Fire. Mater. Vol. 31, 411-423 (2007) describes a novel flame retardant containing silicon, phosphorus and nitrogen synthesised from the reaction of DOPO, vinylmethyldimethoxysilane and N-β-(aminoethyl)-γ-aminopropyl methyl dimethoxy silane.

The paper 'Siloxane-phosphonate finishes on cellulose: thermal characterization and flammability data' presented by S. Gallagher et al at 2004 Beltwide Cotton Conferences describes applying siloxane phosphonate monomers to cotton fabric.

The paper 'Polybenzoxazine containing polysilsesquioxane: preparation and thermal properties' by Yonghong Liu et al. in Journal of Applied Polymer Science (2006), 99(3), 927-936 describes a benzoxazine-bearing trimethoxysilane and its hydrolysis and condensation to a polysilsesquioxane, which could be reacted with difunctional benzoxazine of bisphenol A to form inorganic-organic hybrids of improved thermal stability.

Due to the widespread and increasing use of synthetic polymers, there are a large number of flame retardant compounds in use in today's plastic markets. Halogen containing flame retardants have performed well in terms of flame retardancy properties, processability, cost, etc, however there is an urgent need for halogen-free flame retardants (HFFR) as polymer additives, which comply with environmental regulations, OEM perception, customers requirements, etc. Fire safety is now based on preventing ignition and reducing flame spread through reducing the rate of heat release, as well as on reducing fire toxicity. Flame retardant additives must be safe in what concerns health and environment, must be cost efficient and maintain/improve plastics performance.

The halogenated flame retardant compounds act mostly in the vapour phase by a radical mechanism to interrupt the exothermic processes and to suppress combustion. Examples are the bromine compounds, such as tetrabromobisphenol A, chlorine compounds, halogenated phosphate ester, etc.

Among the halogen-free flame retardants one can find the metal hydroxides, such as magnesium hydroxide ($Mg(OH)_2$) or aluminium hydroxide ($Al(OH)_3$), which act by heat absorbance, i.e. endothermic decomposition into the respective oxides and water when heated, however they present low flame retardancy efficiency, low thermal stability and significant deterioration of the physical/chemical properties of the matrices. Other compounds act mostly on the condensed phase, such as expandable graphite, organic phosphorous (e.g. phosphate, phosphonates, phosphine, phosphine oxide, phosphonium compounds, phosphites, etc.), ammonium polyphosphate, etc. Zinc borate, nanoclays and red phosphorous are other examples of halogen-free flame retardants. Silicon-containing additives are known to significantly improve the flame retardancy, acting both through char formation in the condensed phase and by the trapping of active radicals in the vapour phase. Sulfur-containing additives, such as potassium diphenylsulfone sulfonate (KSS), are well known flame retardant additives for thermoplastics, in particular for polycarbonate.

Either the halogenated, or the halogen-free compounds can act by themselves, or as synergetic agent together with the compositions claimed in the present patent to render the desired flame retardance performance to many polymer matrices. For instance, phosphonate and phosphine or phosphine oxide have been referred in the literature as being anti-dripping agents and can be used in synergy with the flame retardant additives disclosed in the present patent. The paper "Flame-retardant and anti-dripping effects of a novel char-forming flame retardant for the treatment of poly(ethylene terephthalate) fabrics" presented by Dai Qi Chen et al. at 2005 Polymer Degradation and Stability describes the application of a phosphonate, namely poly(2-hydroxy propylene spirocyclic pentaerythritol bisphosphonate) to impart flame retardance and dripping resistance to poly(ethylene terephthalate) (PET) fabrics. Benzoguanamine has been applied to PET fabrics to reach anti-dripping performance as reported by Hong-yan Tang et al. at 2010 in "A novel process for preparing anti-dripping polyethylene terephthalate fibres", Materials & Design. The paper "Novel Flame-Retardant and Anti-dripping Branched Polyesters Prepared via Phosphorus-Containing Ionic Monomer as End-Capping Agent" by Jun-Sheng Wang et al. at 2010 reports on a series of novel branched polyester-based ionomers which were synthesized with trihydroxy ethyl esters of trimethyl-1,3,5-benzentricarboxylate (as branching agent) and sodium salt of 2-hydroxyethyl 3-(phenylphosphinyl)propionate (as end-capping agent) by melt polycondensation. These flame retardant additives dedicated to anti-dripping performance can be used in synergy with the flame retardant additives disclosed in this patent. Additionally, the flame retardant additives disclosed in this patent have demonstrated synergy with other well-known halogen-free additives, such as KSS, Zinc Borates and Metal Hydroxydes (aluminium trihydroxide or Magnesium dihydroxyde). When used as synergists, classical flame retardants such as KSS, Zinc Borates or Metal Hydroxydes (aluminium trihydroxyde or magnesium dihydroxyde) can be either physically blended or surface pre-treated with the silicon based additives disclosed in this patent prior to compounding.

A branched silicone resin according to the present invention contains at least one group selected from phosphonate and phosphinate groups and at least one organic group containing nitrogen.

The invention includes the use of such a branched silicone resin in a thermoplastic, thermosetting or rubber organic polymer composition to reduce the flammability of the organic polymer composition, and includes a thermoplastic, thermoset or rubber organic polymer composition comprising a thermoplastic, thermoset or rubber organic polymer and a branched silicone resin as defined above. The invention also includes the use of such a branched silicone resin as a fire resistant coating on a substrate.

The invention also includes a thermoplastic, thermoset or rubber organic polymer composition comprising a thermoplastic, thermoset or rubber organic polymer, a branched silicone resin containing at least one group selected from phosphonate and phosphinate groups and a branched silicone resin containing at least one organic group containing nitrogen.

Polyorganosiloxanes, also known as silicones, generally comprise siloxane units selected from $R_3SiO_{1/2}$ (M units), $R_2SiO_{2/2}$ (D units), $RSiO_{3/2}$ (T units) and $SiO_{4/2}$ (Q units), in which each R represents an organic group or hydrogen or a hydroxyl group. Branched silicone resins contain T and/or Q units, optionally in combination with M and/or D units. In the branched silicone resins of the invention, at least 25% of the siloxane units are preferably T and/or Q units. More preferably, at least 75% of the siloxane units in the branched silicone resin are T and/or Q units.

In a process for the preparation of a branched silicone resin according to the invention, at least one alkoxysilane of the formula $R_PSi(OR')_3$, $R_PR^{11}Si(OR')_2$ or $R_PR^{11}_2SiOR'$, at least one alkoxysilane of the formula $R_NSi(OR')_3$, $R_NR^{12}Si(OR')_2$ or $R_PR^{12}_2SiOR'$, and optionally one or more alkoxysilane of the formula $Si(OR')_4$, $R^4Si(OR')_3$, $R^4_2Si(OR')_2$ or $R^4_3SiOR'$, where each R', which can be the same or different, is an alkyl group having 1 to 4 carbon atoms; each $R_P$ is an alkyl, cycloalkyl, alkenyl, alkynyl or aryl group having 1 to 20 carbon atoms containing a phosphonate or phosphinate substituent; each $R^{11}$ which can be the same or different is an alkyl, cycloalkyl, alkenyl, alkynyl or aryl group having 1 to 20 carbon atoms or an alkyl, cycloalkyl, alkenyl, alkynyl or aryl group having 1 to 20 carbon atoms containing a phosphonate or phosphinate substituent; each $R_N$ is an alkyl, cycloalkyl, alkenyl, alkynyl or aryl group having 1 to 20 carbon atoms containing an organic nitrogen substituent; each $R^{12}$ which can be the same or different is an alkyl, cycloalkyl, alkenyl, alkynyl or aryl group having 1 to 20 carbon atoms or an alkyl, cycloalkyl, alkenyl, alkynyl or aryl group having 1 to 20 carbon atoms containing an organic nitrogen substituent; and each $R^4$ which can be the same or different is an alkyl, cycloalkyl, alkenyl, alkynyl or aryl group having 1 to 20 carbon atoms, are hydrolysed and condensed to form siloxane bonds.

In an alternative process for the preparation of a branched silicone resin according to the invention, at least one alkoxysilane of the formula $R_PR_NSi(OR')_2$ or $RpR_NR^{13}SiOR'$, and optionally one or more alkoxysilane of the formula $Si(OR')_4$, $R^4Si(OR')_3$, $R^4_2Si(OR')_2$, $R^4_3SiOR'$, $R_PSi(OR')_3$, $R_PR^{11}Si(OR')_2$, $R_PR^{11}_2SiOR'$, $R_NSi(OR')_3$, $R_NR^{12}Si(OR')_2$ or $R_PR^{12}_2SiOR'$, where each R' which can be the same or different is an alkyl group having 1 to 4 carbon atoms; each $R_P$ is an alkyl, cycloalkyl, alkenyl, alkynyl or aryl group having 1 to 20 carbon atoms containing a phosphonate or phosphinate substituent; each $R_N$ is an alkyl, cycloalkyl, alkenyl, alkynyl or aryl group having 1 to 20 carbon atoms containing an organic nitrogen substituent; each $R^{13}$ is an alkyl, cycloalkyl, alkenyl, alkynyl or aryl group having 1 to 20 carbon atoms or an alkyl, cycloalkyl, alkenyl, alkynyl or aryl group having 1 to 20 carbon atoms containing a phosphonate or phosphinate substituent or an organic nitrogen substituent; each $R^4$ is an alkyl, cycloalkyl, alkenyl, alkynyl or aryl group having 1 to 20 carbon atoms; each $R^{11}$ is an alkyl, cycloalkyl, alkenyl, alkynyl or aryl group having 1 to 20 carbon atoms or an alkyl, cycloalkyl, alkenyl, alkynyl or aryl group having 1 to 20 carbon atoms containing a phosphonate or phosphinate substituent; and each $R^{12}$ is an alkyl, cycloalkyl, alkenyl, alkynyl or aryl group having 1 to 20 carbon atoms or an alkyl, cycloalkyl, alkenyl, alkynyl or aryl group having 1 to 20 carbon atoms containing an organic nitrogen substituent, is hydrolysed and condensed to form siloxane bonds.

In a further alternative process for the preparation of a branched silicone resin according to the invention, at least one alkoxysilane of the formula $RbSi(OR')_3$, $RbR^{13}Si(OR')_2$ or $RbR^{13}_2SiOR'$, and optionally one or more alkoxysilane of the formula $Si(OR')_4$, $R^4Si(OR')_3$, $R^4_2Si(OR')_2$, $R^4_3SiOR'$, $R_PSi(OR')_3$, $R_PR^{11}Si(OR')_2$, $R_PR^{11}_2SiOR'$, $R_NSi(OR')_3$, $R_NR^{12}Si(OR')_2$ or $R_PR^{12}_2SiOR'$, where each R' which can be the same or different is an alkyl group having 1 to 4 carbon atoms, each Rb is an alkyl, cycloalkyl, alkenyl, alkynyl or aryl group having 1 to 20 carbon atoms containing both a phosphonate or phosphinate substituent and an organic nitrogen group; each $R^{13}$ which can be the same or different is an alkyl, cycloalkyl, alkenyl, alkynyl or aryl group having 1 to 20 carbon atoms or an alkyl, cycloalkyl, alkenyl, alkynyl or aryl group having 1 to 20 carbon atoms containing a phosphonate or phosphinate substituent and/or an organic nitrogen group; $R_P$ is an alkyl, cycloalkyl, alkenyl, alkynyl or aryl group having 1 to 20 carbon atoms containing a phosphonate or phosphinate substituent; $R_N$ is an alkyl, cycloalkyl, alkenyl, alkynyl or aryl group having 1 to 20 carbon atoms containing an organic nitrogen substituent; each $R^4$ is an alkyl, cycloalkyl, alkenyl, alkynyl or aryl group having 1 to 20 carbon atoms, each $R^{11}$ is an alkyl, cycloalkyl, alkenyl, alkynyl or aryl group having 1 to 20 carbon atoms or an alkyl, cycloalkyl, alkenyl, alkynyl or aryl group having 1 to 20 carbon atoms containing a phosphonate or phosphinate substituent; and each $R^{12}$ is an alkyl, cycloalkyl, alkenyl, alkynyl or aryl group having 1 to 20 carbon atoms or an alkyl, cycloalkyl, alkenyl, alkynyl or aryl group having 1 to 20 carbon atoms containing an organic nitrogen substituent, is hydrolysed and condensed to form siloxane bonds.

In a process according to another aspect of the invention for the preparation of an organopolysiloxane containing a phosphonate or phosphinate group, characterized in that an organopolysiloxane containing an olefinically unsaturated group is reacted with a phosphite of the formula

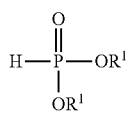

or a phosphinate of the formula

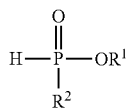

where each $R^1$ which can be the same or different is an alkyl group having 1 to 12 carbon atoms, and $R^2$ is an alkyl, cycloalkyl, alkenyl, alkynyl or aryl group having 1 to 20 carbon atoms, in the presence of a free radical initiator.

In a process according to another aspect of the invention for the preparation of an organopolysiloxane containing a phosphonate or phosphinate group, characterized in that an organopolysiloxane containing an amino group is reacted with an olefinic phosphite of the formula

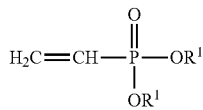

or an olefinic phosphinate of the formula

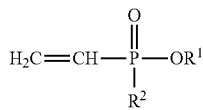

where each $R^1$ which can be the same or different is an alkyl group having 1 to 12 carbon atoms, and $R^2$ is an alkyl, cycloalkyl, alkenyl, alkynyl or aryl group having 1 to 20 carbon atoms.

The branched silicone resin of the invention preferably contains at least one phosphonate or phosphinate moiety present in a T unit of the formula $R_PSiO_{3/2}$, where $R_P$ is an alkyl, cycloalkyl, alkenyl, alkynyl or aryl group having 1 to 20 carbon atoms containing a phosphonate or phosphinate substituent. The group $R_P$ can for example have the formula

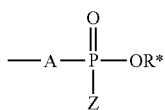

where A is a divalent hydrocarbon group having 1 to 20 carbon atoms and R* is an alkyl or aryl group having 1 to 12 carbon atoms. If the group $R_P$ contains a phosphonate substituent, Z is preferably a group of the formula —OR*. If the group $R_P$ contains a phosphinate substituent, Z is preferably an alkyl, cycloalkyl, alkenyl, alkynyl or aryl group having 1 to 20 carbon atoms. Preferred groups $R_P$ include 2-(diethylphosphonato)ethyl, 3-(diethylphosphonato)propyl, 2-(dimethylphosphonato)ethyl, 3-(dimethylphosphonato)propyl, 2-(ethyl(ethylphosphinato))ethyl and 3-(ethyl(ethylphosphinato))propyl.

The phosphinate substituent can alternatively comprise a 9,10-dihydro-9-oxa-10-phosphaphenanthrene-10-oxide group, sometimes known as a DOPO group. The group $R_P$ can for example have the formula

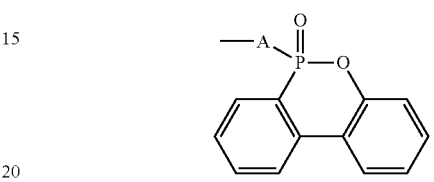

where A is a divalent hydrocarbon group having 1 to 20 carbon atoms, for example 2-DOPO-ethyl or 3-DOPO-propyl.

The branched silicone resin of the invention preferably contains at least one organic nitrogen-containing group present in a T unit of the formula $R_NSiO_{3/2}$, where $R_N$ is an alkyl, cycloalkyl, alkenyl, alkynyl or aryl group having 1 to 20 carbon atoms containing a organic nitrogen substituent. In one preferred type of resin according to the invention the organic group containing nitrogen is a heterocyclic group present as a group of the formula

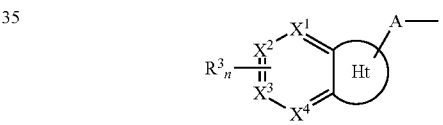

where $X^1$, $X^2$, $X^3$ and $X^4$ independently represent a CH group or a N atom and form a benzene, pyridine, pyridazine, pyrazine, pyrimidine or triazine aromatic ring; Ht represents a heterocyclic ring fused to the aromatic ring and comprising 2 to 40 carbon atoms, alternatively comprising 2 to 8 carbon atoms, 1 to 4 nitrogen atoms and optionally 1 or 2 oxygen and/or sulphur atoms; A represents a divalent organic linkage having 1 to 20 carbon atoms bonded to a nitrogen atom of the heterocyclic ring; the heterocyclic ring can optionally have one or more substituent groups selected from alkyl, substituted alkyl, cycloalkyl, alkenyl, alkynyl, aryl and substituted aryl groups having 1 to 12 carbon atoms and amino, nitrile, amido and imido groups; and $R^3{}_n$, with n=0-4, represents an alkyl, substituted alkyl, alkenyl group having 1 to 8 carbon atoms or cycloalkyl, alkynyl, aryl or substituted aryl group having 1 to 40 carbon atoms, or an amino, nitrile, amido or imido group or a carboxylate —C(=O)—O—$R^4$, oxycarbonyl —O—(C=O)—$R^4$, carbonyl —C(=O)—$R^4$, or an oxy —O—$R^4$ substituted group with $R^4$ representing hydrogen or an alkyl, cycloalkyl, alkenyl, alkynyl, aryl, or substituted aryl groups having 1 to 40 carbon atoms, substituted on one or more positions of the aromatic ring, or two groups $R^3$ can be joined to form a ring system comprising at least one carbocyclic or heterocyclic ring fused to the aromatic ring.

The heterocyclic ring Ht is preferably not a fully aromatic ring, i.e. it is preferably not a pyridine, pyridazine, pyrazine, pyrimidine or triazine aromatic ring. The heterocyclic ring Ht can for example be an oxazine, pyrrole, pyrroline, imidazole, imidazoline, thiazole, thiazoline, oxazole, oxazoline, isoxazole or pyrazole ring. Examples of preferred heterocyclic ring systems include benzoxazine, indole, benzimidazole, benzothiazole and benzoxazole. In some preferred resins the heterocyclic ring is an oxazine ring so that $R_N$ is a group of the formula

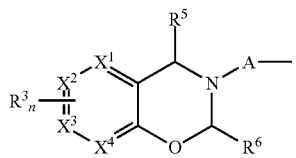

where $X^1$, $X^2$, $X^3$ and $X^4$, A, $R^3$ and n are defined as above and $R^5$ and $R^6$ each represent hydrogen, an alkyl, substituted alkyl, cycloalkyl, alkenyl, alkynyl, aryl or substituted aryl group having 1 to 12 carbon atoms, or an amino or nitrile group. The group can for example be a benzoxazine group of the formula

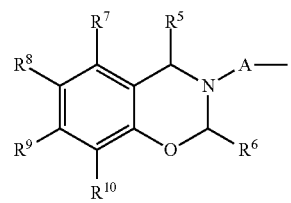

where $R^7$, $R^8$, $R^9$ and $R^{10}$ each represent hydrogen, an alkyl, substituted alkyl, alkenyl group having 1 to 8 carbon atoms or cycloalkyl, alkynyl, aryl or substituted aryl group having 1 to 40 carbon atoms, or an amino, nitrile, amido or imido group or a carboxylate —C(=O)—O—$R^4$, oxycarbonyl —O—(C=O))—$R^4$, carbonyl —C(=O)—$R^4$, or an oxy —O—$R^4$ substituted group with $R^4$ representing hydrogen or an alkyl, cycloalkyl, alkenyl, alkynyl, aryl, or substituted aryl groups having 1 to 40 carbon atoms, or $R^7$ and $R^8$, $R^8$ and $R^9$ or $R^9$ and $R^{10}$ can each be joined to form a ring system comprising at least one carbocyclic or heterocyclic ring fused to the benzene ring.

The oxazine or other heterocyclic ring Ht can alternatively be bonded to a pyridine ring to form a heterocyclic group of the formula

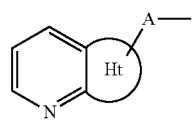

The benzene, pyridine, pyridazine, pyrazine or triazine aromatic ring can be annelated to a ring system comprising at least one carbocyclic or heterocyclic ring to form an extended ring system enlarging the pi-electron conjugation. A benzene ring can for example be annelated to another benzene ring to form a ring system containing a naphthanene moiety

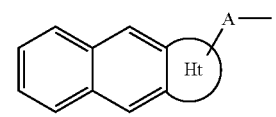

such as a naphthoxazine group, or can be annelated to a pyridine ring to form a ring system containing a quinoline moiety.

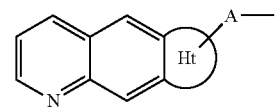

A pyridine ring can for example be annelated to a benzene ring to form a ring system containing a quinoline moiety in which the heterocyclic ring Ht, for example an oxazine ring, is fused to the pyridine ring

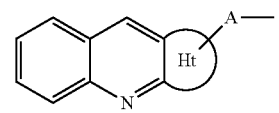

The aromatic ring can be annelated to a quinone ring to form a naphthoquinoid or anthraquinoid structure. In an alkoxysilane of the formula

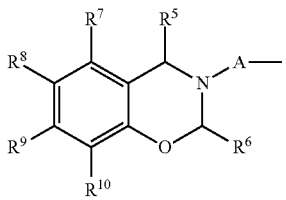

the groups $R^8$ and $R^9$, $R^7$ and $R^8$, or $R^9$ and $R^{19}$ can form an annelated ring of naphthoquinoid or anthraquinoid structure. Such ring systems containing carbonyl groups may form resins having improved solubility in organic solvents, allowing easier application to polymer compositions.

The organic group $R_N$ containing nitrogen can alternatively comprise an aminoalkyl or aminoaryl group containing 1 to 20 carbon atoms and 1 to 3 nitrogen atoms bonded to a silicon atom of the silicone resin, for —(CH$_2$)$_3$NH$_2$, —(CH$_2$)$_4$NH$_2$, —CH$_2$CH(CH$_3$)CH$_2$NH$_2$, —CH$_2$CH(CH$_3$)CH$_2$NH(CH$_2$)$_2$NH$_2$, —(CH$_2$)$_3$NHCH$_2$CH$_2$NH(CH$_2$)$_2$NH$_2$, —CH$_2$CH(CH$_3$)CH$_2$NH(CH$_2$)3NH$_2$, —(CH$_2$)$_3$NH(CH$_2$)$_4$NH$_2$, —(CH$_2$)$_3$O(CH$_2$)$_2$NH$_2$, —(CH$_2$)$_3$NHC$_6$H$_5$, —(CH$_2$)$_3$NH(CH$_2$)$_2$NHC$_6$H$_5$, —(CH$_2$)$_3$NHCH$_3$, or —(CH$_2$)$_3$N(C$_6$H$_5$)$_2$.

A branched silicone resin of the invention containing at least one phosphonate or phosphinate moiety present in a T unit of the formula $R_PSiO_{3/2}$ can for example be prepared by a process in which a trialkoxysilane of the formula $R_PSi(OR')_3$ is hydrolysed and condensed to form siloxane bonds. Examples of useful trialkoxysilanes containing a $R_P$ group are 2-(diethylphosphonato)ethyltriethoxysilane, 3-(diethylphosphonato)propyltriethoxysilane and 2-(DOPO)ethyltriethoxysilane.

A branched silicone resin of the invention containing at least one organic nitrogen-containing group present in a T unit of the formula $R_NSiO_{3/2}$ can for example be prepared by a process in which a trialkoxysilane of the formula $R_NSi(OR')_3$ is hydrolysed and condensed to form siloxane bonds. Examples of useful trialkoxysilanes containing a $R_N$ group are 3-(3-benzoxazinyl)propyltriethoxysilane

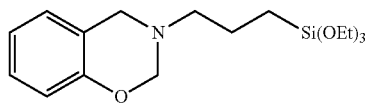

and the corresponding naphthoxazinetriethoxysilane,

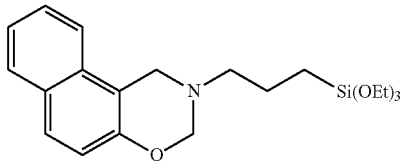

3-(6-cyanobenzoxazinyl-3)propyltriethoxysilane,

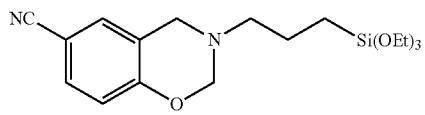

3-(2-phenylbenzoxazinyl-3)propyltriethoxysilane

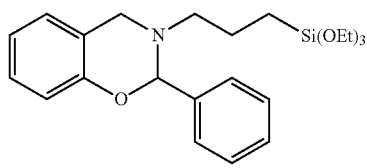

and 3-aminopropyltrimethoxysilane.

The branched silicone resin containing at least one organic nitrogen-containing group can be formed from a bis(alkoxysilane), for example a bis(trialkoxysilane), containing two heterocyclic rings each having an alkoxysilane substituent, such as 1,3-bis(3-(3-trimethoxysilylpropyl)benzoxazinyl-6)-2,2-dimethylpropane

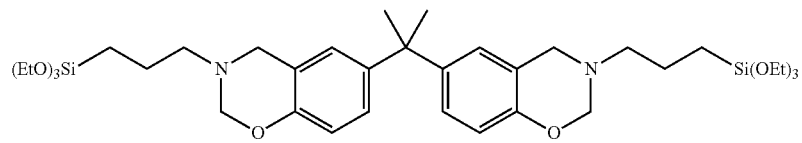

The branched silicone resin can in one preferred embodiment comprises mainly T units, that is at least 50 mole % T units, and more preferably at least 80 or 90% T units. It can for example comprise substantially all T units. The trialkoxysilanes of the formulae $R_PSi(OR')_3$ and $R_NSi(OR')_3$ can be co-hydrolysed and condensed, optionally with an alkoxysilane of the formula $R^4Si(OR')_3$, in which each R' is an alkyl group having 1 to 4 carbon atoms and $R^4$ represents an alkyl, cycloalkyl, aminoalkyl, alkenyl, alkynyl, aryl or aminoaryl group having 1 to 20 carbon atoms. Examples of useful trialkoxysilanes of the formula $R^4Si(OR')_3$ are alkyltrialkoxysilanes such as methyltriethoxysilane, ethyltriethoxysilane, methyltrimethoxysilane, aryltrialkoxysilanes such as phenyltriethoxysilane and alkenyltrialkoxysilanes such as vinyltrimethoxysilane.

Alternative alkoxysilanes containing a phosphonate or phosphinate group are monoalkoxysilanes for example of the formula $R_PR^{11}_2SiOR'$ and dialkoxysilanes for example of the formula $R_PR^{11}Si(OR')_2$, where each R' is an alkyl group having 1 to 4 carbon atoms; each $R_P$ is an alkyl, cycloalkyl, alkenyl, alkynyl or aryl group having 1 to 20 carbon atoms containing a phosphonate or phosphinate substituent; and each $R^{11}$ which can be the same or different is an alkyl, cycloalkyl, alkenyl, alkynyl or aryl group having 1 to 20 carbon atoms or an alkyl, cycloalkyl, alkenyl, alkynyl or aryl group having 1 to 20 carbon atoms containing a phosphonate or phosphinate substituent. Examples of suitable monoalkoxysilanes containing a phosphonate or phosphinate group are 2-(DOPO)ethyldimethylethoxysilane and 3-(diethylphosphonato)propyldimethylethoxysilane. Examples of suitable dialkoxysilanes containing a phosphonate or phosphinate group are 2-(DOPO)ethylmethyldiethoxysilane and 3-(diethylphosphonato)propylmethyldiethoxysilane.

Alternative alkoxysilanes containing an organic nitrogen-containing group are monoalkoxysilanes for example of the formula $R_NR^{12}_2SiOR'$ and dialkoxysilanes for example of the formula $R_NR^{12}Si(OR')_2$ where each $R_N$ is an alkyl, cycloalkyl, alkenyl, alkynyl or aryl group having 1 to 20 carbon atoms containing an organic nitrogen substituent; and each $R^{12}$ which can be the same or different is an alkyl, cycloalkyl, alkenyl, alkynyl or aryl group having 1 to 20 carbon atoms or an alkyl, cycloalkyl, alkenyl, alkynyl or aryl group having 1 to 20 carbon atoms containing an organic nitrogen substituent. Examples of suitable monoalkoxysilanes containing an organic nitrogen substituent are 3-(3-benzoxazinyl)propyldimethylethoxysilane and 3-aminopropyldimethylethoxysilane. Examples of suitable dialkoxysilanes containing an organic nitrogen substituent are 3-(3-benzoxazinyl)propylmethyldiethoxysilane and 3-aminopropylmethyldimethoxysilane.

Monoalkoxysilanes when hydrolysed and condensed will form M groups in the silicone resin and dialkoxysilanes when hydrolysed and condensed will form D groups in the silicone resin. A monoalkoxysilane or dialkoxysilane containing a $R_P$ group can be reacted with trialkoxysilanes and/or tetraalkoxysilanes to form a branched silicone resin. A monoalkoxysilane or dialkoxysilane containing a $R_P$ group can be reacted with a trialkoxysilane containing a $R_N$ group, and optionally another trialkoxysilane and/or a tetraalkoxysilane, to form a branched silicone resin according to the invention. A monoalkoxysilane or dialkoxysilane containing a $R_N$ group can be reacted with a trialkoxysilane containing a $R_P$ group, and optionally another trialkoxysilane and/or a tetraalkoxysilane, to form a branched silicone resin according to the invention. Alternatively a monoalkoxysilane or dialkoxysilane containing a $R_P$ group can be reacted with a monoalkoxysilane or dialkoxysilane containing a $R_N$ group and a trialkoxysilane and/or a tetraalkoxysilane to form a branched silicone resin according to the invention. For example a monoalkoxysilane containing a $R_P$ group and a monoalkoxysilane containing a $R_N$ group can be reacted with tetraethoxysilane to form a MQ branched silicone resin.

The branched silicone resin of the invention can alternatively be formed from an alkoxysilane containing both a phosphonate or phosphinate group and an organic nitrogen-containing group. Examples of such alkoxysilanes include dialkoxysilanes of the formula $R_P R_N Si(OR')_2$ and monoalkoxysilanes of the formula $RpR_N R^{13} SiOR'$, where each R' is an alkyl group having 1 to 4 carbon atoms; each $R_P$ is an alkyl, cycloalkyl, alkenyl, alkynyl or aryl group having 1 to 20 carbon atoms containing a phosphonate or phosphinate substituent; each $R_N$ is an alkyl, cycloalkyl, alkenyl, alkynyl or aryl group having 1 to 20 carbon atoms containing an organic nitrogen substituent; and each $R^{13}$ is an alkyl, cycloalkyl, alkenyl, alkynyl or aryl group having 1 to 20 carbon atoms or an alkyl, cycloalkyl, alkenyl, alkynyl or aryl group having 1 to 20 carbon atoms containing a phosphonate or phosphinate substituent or an organic nitrogen substituent. Examples of dialkoxysilanes include 2-DOPO-ethyl 3-aminopropyl dimethoxy silane and 3-(diethylphosphonato)propyl 3-(3-benzoxazinyl)propyl dimethoxy silane. Examples of monoalkoxysilanes include 2-DOPO-ethyl 3-aminopropyl methyl methoxy silane and 3-(diethylphosphonato)propyl 3-(3-benzoxazinyl)propyl methyl methoxy silane. Such alkoxysilanes can be hydrolysed and condensed with at least one alkoxysilane of the formula $Si(OR')_4$, $R^4 Si(OR')_3$, $R_P Si(OR')_3$ or $R_N Si(OR')_3$, and optionally one or more alkoxysilane of the formula $R^4_2 Si(OR')_2$, $R^4_3 SiOR'$, $R_P R^{11} Si(OR')_2$, $R_P R^{11}_2 SiOR'$, $R_N R^{12} Si(OR')_2$ or $R_P R^{12}_2 SiOR'$, where each $R^4$ is an alkyl, cycloalkyl, alkenyl, alkynyl or aryl group having 1 to 20 carbon atoms; each $R^{11}$ is an alkyl, cycloalkyl, alkenyl, alkynyl or aryl group having 1 to 20 carbon atoms or an alkyl, cycloalkyl, alkenyl, alkynyl or aryl group having 1 to 20 carbon atoms containing a phosphonate or phosphinate substituent; and each $R^{12}$ is an alkyl, cycloalkyl, alkenyl, alkynyl or aryl group having 1 to 20 carbon atoms or an alkyl, cycloalkyl, alkenyl, alkynyl or aryl group having 1 to 20 carbon atoms containing an organic nitrogen substituent, to form a branched silicone resin according to the invention.

An alternative example of an alkoxysilane containing both a phosphonate or phosphinate group and an organic nitrogen-containing group is an alkoxysilane in which the phosphonate or phosphinate group and the organic group containing nitrogen are both present in a single group bonded to the silicon atom of the alkoxysilane. Examples of such alkoxysilanes have the formula $RbSi(OR')_3$, $RbR^{13} Si(OR')_2$ or $RbR^{13}_2 SiOR'$, where each R' is an alkyl group having 1 to 4 carbon atoms, each Rb is an alkyl, cycloalkyl, alkenyl, alkynyl or aryl group having 1 to 20 carbon atoms containing both a phosphonate or phosphinate substituent and an organic nitrogen group; each $R^{13}$ is an alkyl, cycloalkyl, alkenyl, alkynyl or aryl group having 1 to 20 carbon atoms or an alkyl, cycloalkyl, alkenyl, alkynyl or aryl group having 1 to 20 carbon atoms containing a phosphonate or phosphinate substituent and/or an organic nitrogen group. Such an alkoxysilane can be hydrolysed and condensed to form siloxane bonds, optionally together with one or more alkoxysilane of the formula $Si(OR')_4$, $R^4 Si(OR')_3$, $R^4_2 Si(OR')_2$, $R^4_3 SiOR'$, $R_P Si(OR)_3$, $R_P R^{11} Si(OR')_2$, $R_P R^{11}_2 SiOR$, $R_N Si(OR')_3$, $R_N R^{12} Si(OR')_2$ or $R_P R^{12}_2 SiOR'$, where $R_P$ is an alkyl, cycloalkyl, alkenyl, alkynyl or aryl group having 1 to 20 carbon atoms containing a phosphonate or phosphinate substituent; $R_N$ is an alkyl, cycloalkyl, alkenyl, alkynyl or aryl group having 1 to 20 carbon atoms containing an organic nitrogen substituent; each $R^4$ is an alkyl, cycloalkyl, alkenyl, alkynyl or aryl group having 1 to 20 carbon atoms, each $R^{11}$ is an alkyl, cycloalkyl, alkenyl, alkynyl or aryl group having 1 to 20 carbon atoms or an alkyl, cycloalkyl, alkenyl, alkynyl or aryl group having 1 to 20 carbon atoms containing a phosphonate or phosphinate substituent; and each $R^{12}$ is an alkyl, cycloalkyl, alkenyl, alkynyl or aryl group having 1 to 20 carbon atoms or an alkyl, cycloalkyl, alkenyl, alkynyl or aryl group having 1 to 20 carbon atoms containing an organic nitrogen substituent.

Examples of groups of the formula Rb are groups of the formula

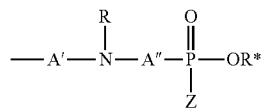

where A' is a divalent organic group having 1 to 20 carbon atoms, A" is a divalent organic group having 1 to 20 carbon atoms, R* is an alkyl group having 1 to 12 carbon atoms and Z is a group of the formula —OR* or an alkyl, cycloalkyl, alkenyl, alkynyl or aryl group having 1 to 12 carbon atoms, or R* and Z can be joined to form a heterocylic ring, and R is hydrogen or an alkyl, cycloalkyl, alkenyl, alkynyl or aryl group having 1 to 12 carbon atoms, or can be joined to A" to form a heterocyclic ring. Examples of alkoxysilanes containing a group Rb are 3-(2-diethylphosphonatoethylamino)propyl triethoxysilane,

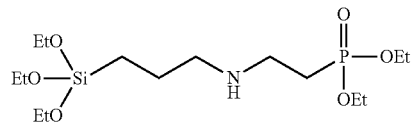 [SMILES: CCO[Si](CCCNCCP(=O)(OCC)OCC)(OCC)OCC]

3-(2-dimethylphosphonatoethylamino)propyl trimethoxysilane, 3-(2-dimethylphosphonatoethylamino)propyl triethoxysilane, 3-(2-(2-phosphonatoethylamino)ethylamino)propyl triethoxysilane

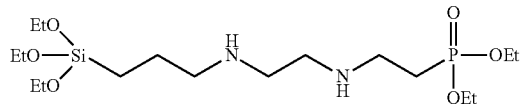 [SMILES: CCO[Si](CCCNCCNCCP(=O)(OCC)OCC)(OCC)OCC]

and 3-(2-DOPO-ethylamino)propyl triethoxysilane. The alkoxysilane containing a group Rb can alternatively be an alkoxysilane-substituted nitrogen-containing heterocyclic compound, such as a benzoxazine alkoxysilane having a phosphonate substituent

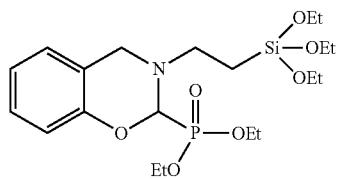 [SMILES: CCO[Si](CCN1Cc2ccccc2OC1P(=O)(OCC)OCC)(OCC)OCC]

or a DOPO substituent

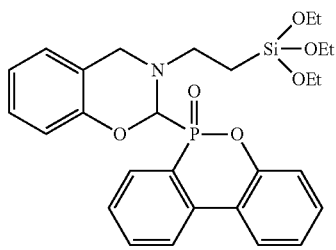 [SMILES: CCO[Si](CCN1Cc2ccccc2OC1P1(=O)Oc2ccccc2-c2ccccc21)(OCC)OCC]

The ratio of phosphonate or phosphinate groups to organic nitrogen-containing groups in the branched silicone resin can vary within a wide range. The molar ratio of phosphorus to nitrogen in the branched silicone resin can for example be in the range 1:9 to 9:1.

The alkoxysilane containing a phosphonate or phosphinate group and the alkoxysilane containing an organic nitrogen-containing group (or the alkoxysilane containing both a phosphonate or phosphinate group and an organic nitrogen-containing group) can be hydrolysed and condensed alone but are more usually co-hydrolysed and condensed with another alkoxysilane, for example an alkyltrialkoxysilane or a tetraalkoxysilane. The alkoxysilane containing a phosphonate or phosphinate group and the alkoxysilane containing an organic nitrogen-containing group can for example be present at 10 to 100 mole % of the alkoxysilanes used to form the silicone resin, so that 10 to 100 mole % of the siloxane units in the silicone resin contain a phosphonate or phosphinate and/or an organic nitrogen-containing moiety.

The branched silicone resin can be produced by heating the appropriate alkoxysilanes as described above in the presence of moisture or hydroxyl groups to cause hydrolysis and siloxane condensation of the alkoxysilane or alkoxysilanes. Atmospheric moisture may be sufficient to cause hydrolysis of the alkoxysilane(s), or water can be added in an amount up to an approximately stoichiometric amount with respect to the Si-bonded alkoxy groups, for example 0.5 to 1.5 moles water per alkoxy group. The reaction can be carried out in the absence of solvent or in a polar organic solvent such as a ketone, for example diethyl ketone or methyl isobutyl ketone. The reaction is preferably carried out at a temperature of 50-120° C. A siloxane condensation catalyst, for example an acid, base or organic tin compound, can be present but the reaction proceeds in the absence of catalyst.

If substantially all the alkoxysilanes reacted to form the branched silicone resin are trialkoxysilanes, the T-resins produced generally have a cage structure, usually a mixture of open and closed cage structures.

In an alternative process according to the invention, a branched silicone resin or other organopolysiloxane containing a phosphonate or phosphinate group is prepared by reacting an organopolysiloxane containing an olefinically unsaturated group is reacted with a phosphite of the formula

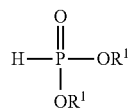

or a phosphinate of the formula

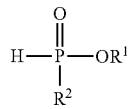

where each $R^1$ which can be the same or different is an alkyl or aryl group having 1 to 12 carbon atoms, and $R^2$ is an alkyl, cycloalkyl, alkenyl, alkynyl or aryl group having 1 to 20 carbon atoms, in the presence of a free radical initiator. Examples of suitable phosphites are diethyl phosphite and dimethyl phosphite. Examples of suitable phosphinates are DOPO (9,10-Dihydro-9-Oxa-10-Phosphaphenanthrene-10-Oxide) and ethyl ethylphosphinate.

An example of a suitable branched silicone resin containing an olefinically unsaturated group is a resin containing a vinyl, allyl or hexenyl group, for example a vinyl T-resin formed by hydrolysis and condensation of a vinyltrialkoxysilane. Examples of other organopolysiloxanes containing an olefinically unsaturated group which can be reacted with the phosphite or phosphinate are polydiorganosiloxanes containing a vinyl, allyl or hexenyl group, for example polydimethylsiloxane (PDMS) containing unsaturated terminal groups such as dimethylvinylsilyl groups.

The free radical initiator can for example be an azo compound such as azobisisobutyronitrile (AIBN) or dimethylazodiisobutyrate, or can be a peroxide such as dicumyl peroxide or 2,5-dimethyl-2,5-di-(tert-butylperoxy)hexane. The organopolysiloxane containing an olefinically unsaturated group is preferably reacted with the phosphite in the presence of the free radical initiator at a temperature in the range 50 to 130° C.

In a further alternative process according to the invention, a branched silicone resin or other organopolysiloxane containing a phosphonate or phosphinate group is prepared by reacting an organopolysiloxane containing a primary or secondary amino group is reacted with an olefinic phosphite of the formula

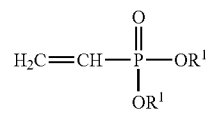

or an olefinic phosphinate of the formula

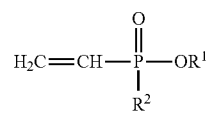

where each $R^1$ which can be the same or different is an alkyl or aryl group having 1 to 12 carbon atoms, and $R^2$ is an alkyl, cycloalkyl, alkenyl, alkynyl or aryl group having 1 to 20 carbon atoms. Examples of suitable vinyl phosphites are vinyldiethyl phosphite and vinyldimethyl phosphite. Examples of suitable phosphinates are vinylethylphosphinate. The organopolysiloxane containing a primary or secondary amino group can for example be a branched silicone resin containing an amino group. A silicone resin containing an amino group of the formula —A'—NHR, where A' and R are defined as above, can be reacted with an olefinic phosphite of the formula

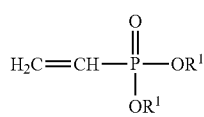

or an olefinic phosphinate of the formula

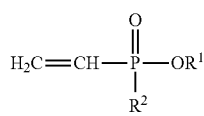

to form a silicone resin containing a group Rb of the formula

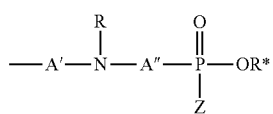

where A', R, Z and R* are defined as above and A" is a —CH$_2$CH$_2$— or —CH(CH$_3$)— linkage.

The branched silicone resins of the invention have a high thermal stability which is higher than that of their non-phosphorylated counterparts and higher than that of linear silicone polymers. This higher thermal stability is due to the presence of the phosphorus atom that leads to the formation of highly stable polyphosphorylated silica ceramic structures. The flame retardancy imparted by the phosphorylated branched silicone resins is further increased by the presence of an organic nitrogen-containing group in the phosphorylated branched silicone resin. Such phosphorylated branched silicone resins additionally containing an amino group undergo an intumescent effect on intense heating, forming a flame resistant insulating char. An organic nitrogen-containing group is a nitrogen containing group linked to an organic moiety.

The branched silicone resins of the invention can be blended with a wide range of thermoplastic resins, for example polycarbonates, ABS (acrylonitrile butadiene styrene) resins, polycarbonate/ABS blends, polyesters, polystyrene, or polyolefins such as polypropylene or polyethylene. The branched silicone resins of the invention can also be blended with thermosetting resins, for example epoxy resins of the type used in electronics applications, which are subsequently thermoset, or unsaturated polyester resin. The branched silicone resins of the invention can also be blended with rubbers such as natural or synthetic rubbers. The mixtures of thermoplastics, thermosets or rubber with the branched silicone resins of the invention as additives have been proved to have a higher thermal stability, as shown by thermogravimetric (TGA) analysis, and better flame retardancy properties, as shown by TGA and the UL-94 test, and/or other flammability tests such as the glow wire test or cone calorimetry, compared to their non phosphorylated counterparts. The branched silicone resins of the invention are particularly effective in increasing the fire resistance of polycarbonates and blends of polycarbonate with other resins such as polycarbonate/ABS blends.

Applications include but are not limited to transportation vehicles, construction, electrical application, printed circuits boards and textiles. Unsaturated polyester resins, or epoxy are moulded for use in, for example, the nacelle of wind turbine devices. Normally, they are reinforced with glass (or carbon) fibre cloth, however, the use of a flame retardant additive is important for avoiding fire propagation.

The branched silicone resins of the invention frequently have further advantages including but not limited to transparency, higher impact strength, toughness, increased adhesion between two surfaces, increased surface adhesion and improved tensile and flexural mechanical properties. The resins can be added to polymer compositions to improve mechanical properties such as impact strength, toughness and tensile and flexural mechanical properties. The resins can be used to treat reinforcing fibres used in polymer matrices to improve adhesion at the fibre polymer interface. The resins can be used at the surface of polymer compositions to improve adhesion to paints.

The branched silicone resins of the invention can for example be present in thermoplastic, thermoset or rubber organic polymer compositions in amounts ranging from 0.1 or 0.5% by weight up to 50 or 75%. Preferred amounts may range from 0.1 to 25% by weight silicone resin in thermoplastic or rubber compositions such as polycarbonates, and from 0.2 to 75% by weight in thermosetting compositions such as epoxy resins.

In an alternative method according to the invention for increasing the fire resistance of a thermoplastic, thermoset or rubber organic polymer composition, for example a polycarbonate or blend of polycarbonate such as a polycarbonate/ABS blend, a branched silicone resin containing at least one group selected from phosphonate and phosphinate groups and a branched silicone resin containing at least one organic group containing nitrogen is added to the thermoplastic, thermosetting or rubber organic polymer composition. The invention thus includes a thermoplastic, thermoset or rubber organic polymer composition comprising a thermoplastic, thermoset or rubber organic polymer, a branched silicone resin containing at least one group selected from phosphonate and phosphinate groups and a branched silicone resin containing at least one organic group containing nitrogen. The weight ratio of branched silicone resin containing at least one group selected from phosphonate and phosphinate groups to branched silicone resin containing at least one organic group containing nitrogen can for example be in the range 0:10 to 9:1 by weight. The invention extends thus to thermoplastic, thermoset or rubber organic polymer comprising a thermoplastic, thermoset or rubber organic polymer and a branched silicone resin containing at least one organic group containing nitrogen.

The total amount of branched silicone resins present in the thermoplastic, thermoset or rubber organic polymer compositions can for example be in the range from 0.1 or 0.5% by weight up to 50 or 75% as described above. It is however preferred to use a branched silicone resin according to the invention containing at least one group selected from phosphonate and phosphinate groups and at least one organic group containing nitrogen. Such a resin containing phosphorus and nitrogen more reliably achieves improved fire resistance and intumescence.

The branched silicone resins of the invention can alternatively be used as a fire resistant coating. The resins can be applied to a wide variety of substrates including plastics, metal, textile, paper and wood substrates, and are particularly effective when applied to structural elements such as walls, columns, girders and lintels as they form an expanded char, behaving as an intumescent material, when exposed to a fire. This expanded (foamed) char acts as an insulating material which limits transfer of heat to adjacent rooms in a fire and protects structural elements so that they do not reach a temperature at which they are weakened, or reach that temperature more slowly. The branched silicone resins are soluble in polar organic solvents such as ketones, for example methyl isobutyl ketone or methyl isoamyl ketone, and aromatic hydrocarbons such as toluene, xylene or trimethylbenzene. The branched silicone resins can be the only polymers in the coating or can be mixed with a film-forming binder such as an epoxy resin, a polyurethane or an acrylic polymer. The resins can be dissolved in an appropriate solvent for use as a fire resistant coating. The dissolved branched silicone resins can be applied by dip-, spin-, spray-coating, etc. on a wide variety of substrates (plastics, textiles, paper, metal, wood, cork, etc.), or as fibre sizing agents, or in filler (aluminium tetrahydrate, ATH, magnesium dihydrate, MDH) treatment, or in carbon nanotube functionalisation.

Compositions containing the branched silicone resins of the invention, or the thermoplastic, thermoset or rubber organic polymer compositions containing a branched silicone resin containing at least one group selected from phosphonate and phosphinate groups and a branched silicone resin containing at least one organic group containing nitrogen, can contain additives such as fillers, pigments, dyes, plasticisers, adhesion promoters, impact resistants, hardeners (e.g. for anti-scratch), coupling agents, antioxidants and/or light stabilisers. Such additives may be used in thermoplastic, thermoset or rubber organic polymer compositions and in coating compositions.

In particular the thermoplastic, thermoset or rubber organic polymer compositions of the invention can contain a reinforcing filler such as silica. The silica is preferably blended with the branched silicone resin of the invention, or with the branched silicone resin containing at least one group selected from phosphonate and phosphinate groups and the branched silicone resin containing at least one organic group containing nitrogen, before the resin(s) is added to the thermoplastic, thermoset or rubber organic polymer composition. When the resin is heated with the silica in the thermoplastic, thermoset or rubber organic polymer composition, there some bonding may take place between the resin and the silica. The silica can for example be present at 0.1 or 0.5% by weight up to 40 or 60% by weight of the thermoplastic, thermoset or rubber organic polymer composition, and can be present at 1 to 500% by weight based on the branched silicone resin.

The thermoplastic, thermoset or rubber organic polymer compositions of the invention can contain a silicone gum, that is a high molecular weight substantially linear polydiorganosiloxane. The silicone gum can for example be a polydimethylsiloxane of viscosity at least 60,000 centiStokes, particularly above 100,000 cSt, and may have a viscosity as high as 30,000,000 cSt. The silicone gum is preferably blended with the branched silicone resin of the invention, or with the branched silicone resin containing at least one group selected from phosphonate and phosphinate groups and the branched silicone resin containing at least one organic group containing nitrogen, before the resin(s) is added to the thermoplastic, thermoset or rubber organic polymer composition. The silicone gum can for example be present at 0.1 or 0.5% by weight up to 20 or 30% by weight of the thermoplastic, thermoset or rubber organic polymer composition, and can be present at 1 to 100% by weight based on the branched silicone resin. The silicone gum acts as a plasticiser for the branched silicone resins and may increase the flexural strength of thermoplastic, thermoset or rubber organic polymer compositions containing the branched silicone resins.

If silica is incorporated in compositions comprising the branched silicone resins as described above, it can be gum-coated silica. Gum-coated silica is sold by Dow Corning under the trademarks DC4-7051 and DC4-7081 as a resin modifier for silicone resins.

The invention is illustrated by the following Examples

EXAMPLE 1

In a round bottomed flask equipped with a magnetic stirrer and placed under nitrogen, 20 gr of vinyl dimethylphosphonate (0.147 moles) were introduced followed by 32.5 gr of aminopropyltriethoxysilane (sold by Dow Corning under the trade mark Z-6011; 0.147 moles) in 100 gr ethanol. The solution was heated at 75° C. for 12 hours under nitrogen. The reaction was cooled down to room temperature and the ethanol was removed under high vacuum. The product is believed to be mainly 3-(2-dimethylphosphonatoethylamino)propyltriethoxysilane.

The hydrolysis and condensation of this trialkoxysilane was conducted at room temperature under high vacuum to obtain an aminophosphorylated branched silicone resin, believed to be a T-resin containing N-(2-dimethylphosphonatoethyl)aminopropyl groups, as a white solid.

3.24 g of the branched silicone resin prepared above was added to 300 g of polycarbonate in an internal mixer compounder at 270° C. The residence time in the mixer was 8 minutes. The composition obtained was pressed in a hot press machine at 250° C. and 100 MPa.

The resulting polycarbonate composition was subjected to conventional thermogravimetric analysis in which the sample was heated to 950° C. at a heating rate of 10° C. per minute. The residue remaining at 950° C. was 30.1%, indicating formation of a considerable amount of ceramic char. By comparison, a sample of the polycarbonate without the silane additive had a residue of 1.24% at 950° C.

The polycarbonate containing the branched silicone resin of Example 1 was also subjected to flash thermogravimetric analysis in which the sample was heated to 500° C. at a heating rate of 300° C. per minute and held at 500° C. for 20 minutes. This test simulates exposure of the composition to a fire. The residue remaining after 20 minutes at 500° C. was 68.5%, indicating formation of a large amount of char. By comparison, a sample of the polycarbonate without the silane additive had a residue of 11.7% after 20 minutes at 500° C.

EXAMPLE 2

In a reaction flask heated up at 80° C., under inert atmosphere (N2 pressure), 20 gr of the vinyl end-capped PDMS (2-7463) (2.6% wtVi, 0.0192 mols Vi) are introduced, followed by 2.65 gr (0.0192 mols) of diethylphosphite. Finally, 0.31 gr of AIBN (0.0019 mols) were added and the reaction mixture stirred at 80° C. for 16 hours. The reaction was cooled down and the crude analyzed by mean of $^{29}$Si and $^{31}$PNMR. It clearly shows the disappearance of the vinyl and P—H functionalities and the formation of the Si—CH2-CH2-P bond.

EXAMPLE 3

Synthesis Description of $T^{DOPO}_{25}T^{Bz}_{5}T^{Ph}_{50}T^{Me}_{20}$ Siloxane Resin In a 700 ml reactor equipped with condenser, KPG stirrer and distillation unit, 148.5 g of Phenyltrimethoxysilane (0.75 mol), 40.8 g of methyltrimethoxysilane (0.3 mol), 136.43 g (0.375 mol) of DOPO-trimethoxysilane, and 24.56 g (0.075 mol) of Methoxy-benzoxazinepropyltrimethoxysilane were mixed under vigorous stirring. Then 33.75 g of distilled water was added and the mixture was heated under stirring to 80 degrees C. for 1 h. Then the reflux condenser was removed and replaced with the distillation condenser which is connected to a diaphragm pump system. A vacuum of 450 mbar was slowly applied while the distillation of methanol has started. The temperature of the vessel was raised to around 110 deg C. for around 3 h and methanol removed until the distillation temperature finally dropped. While still warm (at around 100 deg C.) the highly viscous yellow material was poured into a HDPE container for storage. Around 264.6 g of a finally nearly glassy material was received.

9.64 g of the $T^{DOPO}_{25}T^{Bz}_{5}T^{Ph}_{50}T^{Me}_{20}$ siloxane resin prepared were added to 312 g of polycarbonate in an internal mixer compounder at 270° C. The residence time in the mixer was 8 minutes. The matter obtained was pressed in a hot press machine at 250° C. and 100 MPa.

The composition of Example 3 was subjected to the UL-94 Vertical Burn test in which a flame is applied to the free end of a 120 mm×12 mm sample. The sample was self-extinguishing with a flaming time (average t1) of 8 seconds and did not exhibit dripping (UL-94 V0 rating at 1.5 mm).

COMPARATIVE EXAMPLES

Example 3 was repeated replacing the $T^{DOPO}_{25}T^{Bz}_{5}T^{Ph}_{50}T^{Me}_{20}$ siloxane resin by C1—reference sample with no additive (neat polycarbonate)

The sample (C1) consisting solely of polycarbonate (neat polycarbonate, without any additive) exhibited dripping with ignition of the cotton placed below the sample and an average flaming time t1 of 11 seconds, and therefore a UL-94 V2 classification.

The composition of Example 3 was also subjected to Cone calorimetry analyses and compared with the reference sample (neat polycarbonate). By this technique it was possible to determine the MAHRE value, which is closely related to the heat release rate value. It was found to be decreased by 16.3% compared to the reference sample (C1). AHRE(t), the Average Rate of Heat Emission at time t, is defined as the cumulative heat emission per unit area of exposed specimen, from t=0 to t=t, divided by t. MAHRE is the maximum value of ARHE during that time period.

EXAMPLE 4

Synthesis Description of DOPO-Bz Silane

In a 250 ml flask, equipped with a nitrogen inlet, a condenser, and a magnetic stirrer, 13.26 gr (0.06 mol, 1 eq) of Aminopropyltriethoxysilane (Z-6011), 7.32 g (0.06 mol, 1 eq) of 2-hydroxybenzaldehyde, 12.96 gr (0.06 mol, 1 eq) DOPO and 120 gr methanol were mixed together. The reaction mixture was stirred at room temperature for 12 h. After, 4.92 g (0.06 mol, 1 eq) of 37% formaldehyde was added and the mixture was stirred at room temperature for 6 h and finally refluxed for a further 12 h. The methanol solution was cooled down and the product was drummed off.

EXAMPLE 4a

Preparation of PC+0.5 wt % DOPO-Benzoxazine Siloxane Resin ($T^{DOPO-Bz}_{30}T^{Ph}_{50}T^{Me}_{20}$)

1.61 g of the DOPO-Bz siloxane resin prepared was added to 321.6 g of polycarbonate in an internal mixer compounder at 270° C. The residence time in the mixer was 8 minutes. The matter obtained was pressed in a hot press machine at 250° C. and 100 MPa.

EXAMPLE 4b

Preparation of PC+2.5 wt % DOPO-Benzoxazine Siloxane Resin ($T^{DOPO-Bz}_{30}T^{Ph}_{50}T^{Me}_{20}$)

8.04 g of the DOPO-Bz siloxane resin prepared were added to 314.2 g of polycarbonate in an internal mixer compounder at 270° C. The residence time in the mixer was 8 minutes. The matter obtained was pressed in a hot press machine at 250° C. and 100 MPa.

The compositions of Examples 4a and 4b were subjected to the UL-94 Vertical Burn test in which a flame is applied to the free end of a 120 mm×12 mm sample. The samples were self-extinguishing with similar flaming times (average t1) of ca. 5 seconds and did not exhibit dripping (UL-94 V0 rating at 1.5 mm). On the other hand, a sample consisting solely of polycarbonate (neat polycarbonate, without any additive), sample C1, exhibited dripping with ignition of the cotton placed below the sample and an average flaming time t1 of 11 seconds, and therefore a UL-94 V2 classification.

The compositions of Examples 4a and 4b were also subjected to Cone calorimetry analyses and compared with the reference sample (neat polycarbonate). The table below shows the benefit of adding the DOPO-Benzoxazine siloxane resin to polycarbonate. It leads to a delay in the ignition (longer time to ignition), to a lower peak of heat release rate, to a higher "Fire Performance Index" meaning a less hazardous fire and to a lower smoke emission. The doped sample exhibited as well a stronger intumescing behaviour and the resulting char column appeared to be mechanically stronger than for neat PC.

Cone calorimeter*test results at heat flux of 50 kWm$^{-2}$ on 2 mm thickness plates

|  | C1 (Reference: neat PC) | Example 4b |
|---|---|---|
| Impact resistance (J/m) | 1925 | 1848 |
| Time to ignition (s)* | 66 | 73 |
| pHRR (kWm$^{-2}$)* | 700 | 611 |
| Smoke parameter (MWKg$^{-1}$)* | 429 | 373 |
| Fire Performance Index* | 0.09 | 0.12 |
| Intumescence (mm)* | 50 | 70 |

(fire performance index = ti/pHRR; the higher, the better)

Mechanical impact tests were carried out on the reference sample (neat PC) and sample of Example 4b, showing that the presence of DOPO-Benzoxazine siloxane resin, at 2.5 wt %, does not significantly affect the impact resistance of polycarbonate.

Tg values, by Differential Scanning calorimetry, were found to slightly decrease from 150° C. to 146° C., for 0.5 and 2.5 wt % of such siloxane resin. A loading of 0.5-2.5 wt % is found here to be a good compromise between FR and mechanical performance.

EXAMPLE 5

Preparation of PC+3 wt % DOPO-Aryl Siloxane Resin ($T^{DOPO-arylamino}_{30}T^{Ph}_{50}T^{Me}_{20}$)

9.69 g of the DOPO-arylamino siloxane resin prepared were added to 311.58 g of polycarbonate in an internal mixer compounder at 270° C. The residence time in the mixer was 8 minutes. The matter obtained was pressed in a hot press machine at 250° C. and 100 MPa.

EXAMPLE 6

Preparation of PC+3 wt % DOPO-Aryl Amino Siloxane Resin ($T^{DOPO-arylamino}_{30}T^{Ph}_{50}T^{Me}_{20}$)+0.5 wt % Potassium Diphenylsulfone Sulfonate (KSS)

9.58 g of the DOPO-Bz siloxane resin prepared and 1.58 g of KSS were added to 309.9 g of polycarbonate in an internal mixer compounder at 270° C. The residence time in the mixer was 8 minutes. The matter obtained was pressed in a hot press machine at 250° C. and 100 MPa.

COMPARATIVE EXAMPLES

Example 5 was repeated replacing the DOPO-arylamino siloxane resin ($T^{DOPO-arylamino}_{30}T^{Ph}_{50}T^{Me}_{20}$) by:
C2—0.5 wt % potassium diphenylsulfone sulfonate (KSS)
Both samples, Example 5 and 6, exhibit the same MAHRE value, however sample 6 (with DOPO-arylamino siloxane resin and KSS) exhibits the lowest peak of heat release rate.
Cone calorimeter* test results at heat flux of 50 kWm$^{-2}$ on 4 mm thickness plates

| Sample | Peak of heat release rate (kWm$^{-2}$) | MAHRE (KW) | Heat release rate (KW/m$^2$) |
|---|---|---|---|
| C1 | 444.1 | 240.6 | 228.4 |
| C2 | 399.9 | 248.7 | 270.7 |
| Example 5 | 358.7 | 202.9 | 218.6 |
| Example 6 | 293.5 | 202.5 | 202.1 |

We observe, in sample C2, that the addition of KSS at 0.5 wt % (typical amount for maintaining the transparency of the polycarbonate sample) did not decrease the MAHRE and Heat Release Rate values, on the contrary they were further increased compared to neat PC, as seen in the Table below. KSS is typically used, together with PTFE, for inhibiting dripping and therefore achieving a UL-94 V0 classification. However, in terms of Heat Release Rate or MAHRE decrease, it is not working by itself. On the other hand, sample of Example 5 was found to lead to a decrease of the 3 parameters here evaluated, being such decrease even further intense when the DOPO-arylamino siloxane resin is used together with KSS (Example 6). There is, therefore, a synergy when KSS and DOPO-arylamino siloxane resin are employed as FR additives in PC matrix.

EXAMPLE 7

Synthesis Description of DOPO-aryl Amino Siloxane Resin ($T^{DOPO}_{30}T^{Z6883}_{10}T^{Ph}_{40}Q_{20}$)

In a reactor, 102 g of DOPO-trimethoxysilane, 23.79 gr of phenyltrimethoxysilane and 38.81 gr of tetraethoxysilane were diluted in 204 gr of toluene and heated to 75° C. Once the temperature of 75° C. was reached, a mixture of 53.74 gr water and 53.74 gr methanol was added. The solution was refluxed for 2 hours. After cooling down to room temperature, the mixture was filtered and the low volatiles were removed under reduced pressure (68 mm Hg @ 100° C.) using a rotary evaporator. The obtained resin was further dried under a 30 mmHg vacuum for 2 hours at 100° C. to recover 164.2 gr of the desired resin as a pale yellow solid.

Synthesis Description of Aryl Amino Siloxane Resin ($T^{Z6883}_{50}T^{Ph}_{50}$)

In a reactor, 433.5 g of Z-6883, 336.6 g of Phenyltrimethoxysilane, and 0.45 g (400 ppm) of a 1N potassium hydroxide solution were mixed. Still at room temperature 183.6 g of water and 183.6 g of methanol were added. The mixture was heated then to 70 degrees Celsius and kept under reflux conditions for 1 hour. Removed methanol and water at atmospheric pressure until the reaction mixture temperature rises up to about 70 degree Celsius. Added constantly toluene and continue removal of methanol and water by azeotropic distillation while keeping the toluene concentration at about 50 wt %. When the temperature reached around 110 degrees Celsius the mixture was allowed to reflux for around 6 hours. After cooling down to room temperature, the mixture was neutralized with 0.44 g of acetic acid. Then the solution was filtered and the solvent was removed in vacuum and 535.5 g of a colourless solid was received

EXAMPLE 7a

Preparation of PC+10 wt % $T^{DOPO}_{30}T^{Z6883}_{10}T^{Ph}_{40}Q_{20}$ 32 g of the DOPO-Bz siloxane resin prepared was added to 286 g of polycarbonate in an internal mixer compounder at 270° C. The residence time in the mixer was 8 minutes. The matter obtained was pressed in a hot press machine at 250° C. and 100 MPa.

EXAMPLE 7b

Preparation of PC+15 wt % $T^{Z6883}_{50}T^{Ph}_{50}$ 47.7 g of the DOPO-Bz siloxane resin prepared was added to 268 g of polycarbonate in an internal mixer compounder at 270° C. The residence time in the mixer was 8 minutes. The matter obtained was pressed in a hot press machine at 250° C. and 100 MPa.

Samples of Examples 7a and 7b were analysed by thermal gravimetric analyses, differential scanning calorimetry and Cone calorimetry.

These resins were prepared with a commercial silane (phenyl amino silane, Dow Corning® Z6883). The MAHRE value was found to decrease from 240.6 kW to 193.1 kW when doped at 10 wt % with $T^{DOPO}_{30}T^{Z6883}_{10}T^{Ph}_{40}Q_{20}$, and to 200.7 kW when doped at 15 wt % with $T^{Z6883}_{50}T^{Ph}_{50}$. There was a decrease in MAHRE with both types of FR additives, however, the presence of phosphorus (DOPO) is found to increase the efficiency of the FR additive.

The Table below shows the different parameters evaluated for samples of Examples 7a and 7b. Also, the amount of Si, P, N and phenyl groups (Ph) was calculated in order to correlate this with the MAHRE value and Tg.

| Sample | Thermal degrad. | | MAHRE | wt % | | | |
| | Tg | onset | | Si | N | P | Ph |
|---|---|---|---|---|---|---|---|
| C1 (Reference: neat PC) | 151.5 | 479.4 | 240.6 | — | — | — | — |
| Example 7a | 145.0 | 438.6 | 193.1 | 1.440 | 0.072 | 0.478 | 4.356 |
| Example 7b | 151.4 | 444.2 | 200.7 | 2.316 | 0.579 | — | 6.370 |

The decrease of Tg was found to result from the presence of phosphorus. Si and Ph have no effect on Tg and lead to the increase of the thermal degradation onset. In fact, the siloxane formation promotes cross-linking, which is beneficial to the flame extinguishing behaviour. Contrary to what was expected, a high thermal degradation onset was found not to lead to a low MAHRE. In fact, the opposite was observed. The simultaneous presence of P and N species (P-N synergy) was found to play a major role in the MAHRE value decrease. Moreover, the P-free solution, despite presenting a decreased MAHRE value compared to neat PC, was not as efficient as the SiPN based solutions.

Sample of Example 7b was also analyzed by the UL-94 Vertical Burn test. It is classified as UL-94 V1 because, despite the dripping inhibition observed, the flaming time is not short enough to reach the V0 rating.

The invention claimed is:

1. A branched silicone resin containing T and/or Q units and also containing at least one group selected from phosphonate and phosphinate groups and at least one organic group containing nitrogen, wherein:
   the phosphinate group is present in an M unit and/or a D unit and/or a T unit;
   the organic group containing nitrogen is
a benzoxazine group of the formula:

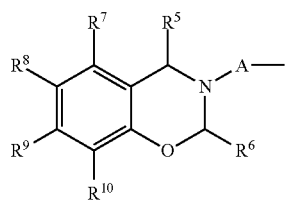

where A represents a divalent organic linkage having 1 to 20 carbon atoms bonded to a nitrogen atom of the heterocyclic ring, $R^5$ and $R^6$ each represent hydrogen, an alkyl, substituted alkyl, cycloalkyl, alkenyl, alkynyl, aryl or substituted aryl group having 1 to 12 carbon atoms, or an amino or nitrile group; and $R^7$, $R^8$, $R^9$ and $R^{10}$ each represent hydrogen, an alkyl, substituted alkyl, alkenyl group having 1 to 8 carbon atoms or cycloalkyl, alkynyl, aryl or substituted aryl group having 1 to 40 carbon atoms, or an amino, nitrile, amido or imido group or a carboxylate —C(=O)—O—$R^4$, oxycarbonyl —O—(C=O)—$R^4$, carbonyl —C(=O)—$R^4$, or an oxy —O—$R^4$ substituted group with $R^4$ representing hydrogen or an alkyl, cycloalkyl, alkenyl, alkynyl, aryl, or substituted aryl groups having 1 to 40 carbon atoms, substituted on one or more positions of the benzene ring, or $R^7$ and $R^8$, $R^8$ and $R^9$ or $R^9$ and $R^{10}$ are each joined to form a ring system comprising at least one carbocyclic or heterocyclic ring fused to the benzene ring; and
the M units have a general formula $R_3SiO_{1/2}$, the D units have a general formula $R_2SiO_{2/2}$, the T units have a general formula $RSiO_{3/2}$, and the Q units have a general formula $SiO_{4/2}$, in which each R represents an organic group or hydrogen or a hydroxyl group.

2. The branched silicone resin according to claim 1, wherein the resin contains at least one phosphonate group present in an M unit and/or a D unit and/or a T unit.

3. The branched silicone resin according to claim 1, wherein the phosphonate or phosphinate group is present in a T unit.

4. The branched silicone resin according to claim 1, wherein the phosphonate or phosphinate group has the formula

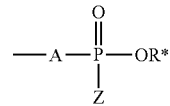

where A is a divalent hydrocarbon group having 1 to 20 carbon atoms, R* is an alkyl or aryl group having 1 to 12 carbon atoms, and Z is a group of the formula —OR* or an alkyl, cycloalkyl, alkenyl, alkynyl or aryl group having 1 to 20 carbon atoms.

5. The branched silicone resin according to claim 1, wherein the phosphinate group has the formula

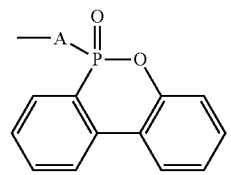

where A is a divalent hydrocarbon group having 1 to 20 carbon atoms.

6. The branched silicone resin according to claim 1, wherein the phosphonate or phosphinate group is present in a group of the formula

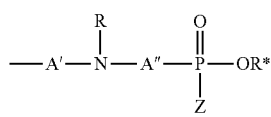

where A' is a divalent organic group having 1 to 20 carbon atoms, A" is a divalent organic group having 1 to 20 carbon atoms, R* is an alkyl group having 1 to 12 carbon atoms and Z is a group of the formula —OR* or an alkyl, cycloalkyl, alkenyl, alkynyl or aryl group having 1 to 12 carbon atoms, or R* and Z can be joined to form a heterocylic ring, and R is hydrogen or an alkyl, cycloalkyl, alkenyl, alkynyl or aryl group having 1 to 12 carbon atoms, or is joined to A" to form a heterocyclic ring.

7. The branched silicone resin according to claim 1 wherein the at least one phosphonate or phosphinate group is an alkyl, cycloalkyl, alkenyl, alkynyl or aryl group having 1 to 20 carbon atoms containing a phosphonate or phosphinate substituent.

* * * * *